Patented Oct. 25, 1932

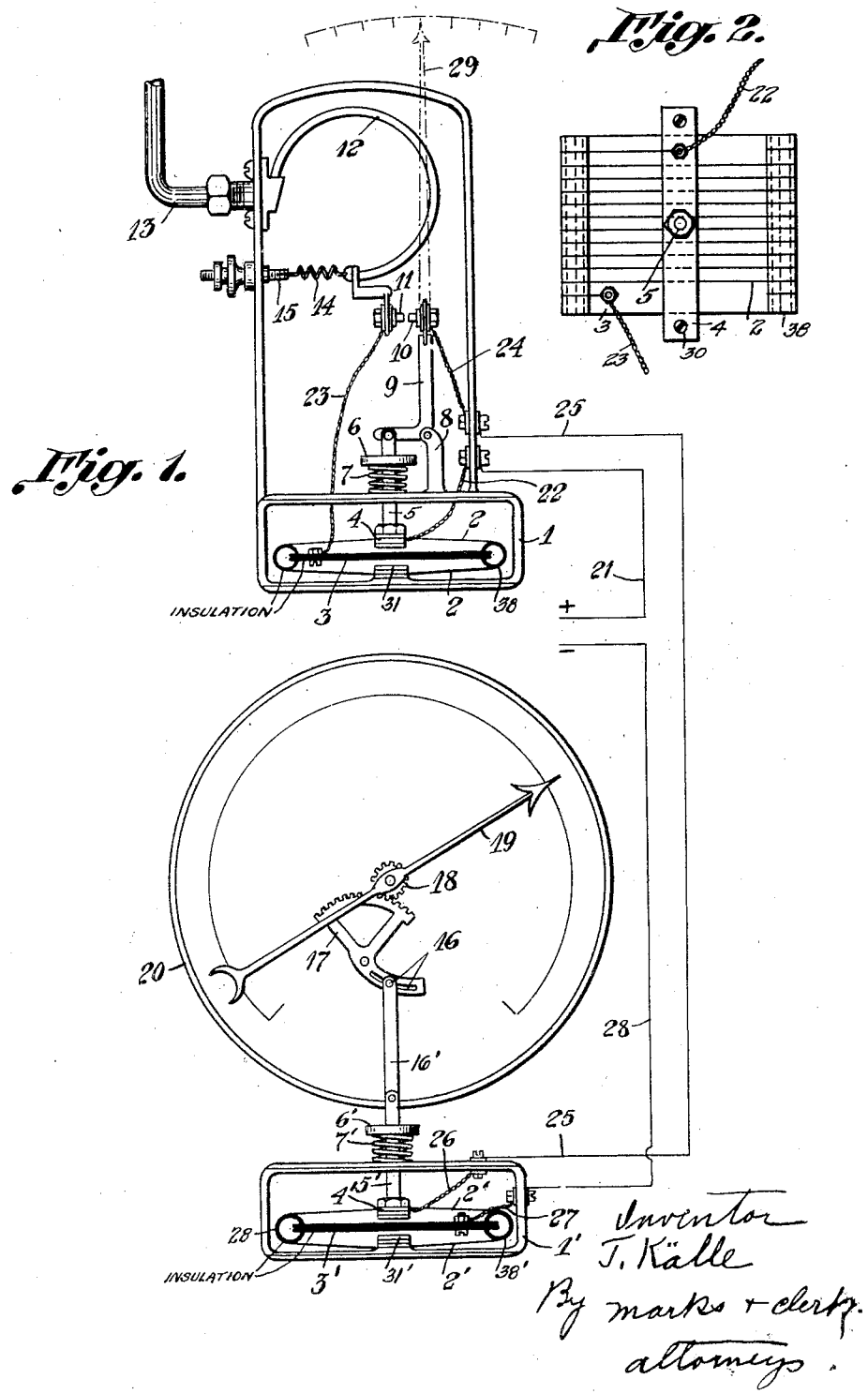

1,885,049

UNITED STATES PATENT OFFICE

TORSTEN KÄLLE, OF SAFFLE, SWEDEN

ELECTROTHERMIC INDICATOR

Application filed July 7, 1925, Serial No. 42,106, and in Sweden July 8, 1924.

This invention relates to a device for indicating at a distance steam-pressure, temperature, velocity of an air or gas current and for similar purposes.

The invention is based upon the combination of a circuit, a contact device and a conductor provided in the circuit, said conductor being adapted to be heated by the electric current, and a member, on which a point is changed with regard to its position through the action of that which is to be measured, the combination being such, that the contact between the contact members or the very short arc passing between the same or shortly the contact resistance is dependent on that which is to be measured, and that the said conductor at the state of equilibrium assumes a temperature and length corresponding to the contact resistance, the contact resistance then prevailing imparting to the current passing through the circuit a distinct intensity. For the indicating of the current intensity a suitable measuring instrument is provided in the circuit and at the remote station, the deflection of the said instrument thus indicating also the variation of that which is to be measured.

One example of the invention is illustrated in Fig. 1 of the accompanying drawings in which it is adapted for indicating at a distance the amount of steam pressure for instance in a boiler.

Fig. 2 shows an electro-thermic device in elevation.

The indicating device shown in the drawings are based upon the use of an electro-thermic device of the type which consists of an electric conductor or wire which is wound round a carrier for the necessary number of turns, the two sets of parts located at opposite sides of the carrier being by yieldable means, springs or the like, subjected to tension and thus held in a divergent position. An electro-thermic device of the said construction is provided at the sender station as well as at the measuring instrument.

The electro-thermic device at the sender station is mounted in a casing 1 and comprises a bare conductor 2, which for the necessary turns is wound round a plate 3, provided at its edges with insulating shoes 38 having grooves, in which the wire 2 is mounted. The lower parts of the conductor 2 are fixed to the bottom wall of the casing 1 by a cross bar 31 and screws and insulated from the same, and the top parts of the conductor 2 are jammed in a cross bar 4, comprising a lower and an upper member connected by screws 30. The said cross-piece is fixed to a rod 5 slidable in a guide provided in the casing 1. A spring 7 bearing against a flange 6 on the rod 5 and against the casing 1 subjects the parts of the conductor to a straining action so that the upper set of parts and the lower set of parts of the conductor form preferably an acute angle relatively to each other. The rod 5 of the upper or contacting unit is pivotally connected to bell crank lever 9, pivoted to an upright 8. The said lever 9 carries the one contact 10, for instance of copper, of a contact device, while the other contact 11, for instance of carbon, of the contact device is carried by a Bourdon-tube 12, which through a pipe 13 communicates with a steam boiler, not shown, or the like, the steam pressure of which is to be indicated. To the free end of the said Bourdon-tube 12 a spring 14 is connected, which may be adjusted by means of a screw 15. By changing the tension of the spring 14, the device may be adapted for use with different ranges of steam pressure, the variations of which are to be indicated.

The electro-thermic device of the indicator unit is provided in a casing 1' and comprises a bare conductor 2', which in the same manner as the conductor 2 is wound round a plate 3' with shoes 38'. The lower parts of the conductor 2' are fixed to the bottom wall of the casing 1' by a cross bar 31' and screws and insulated from the same, while the top parts of the conductor 2' are jammed in a cross bar 4' of the same construction as the bar 4. The said cross bar 4' is fixed to a rod 5', which by means of a link 16' and a pin and slot joint 16 is connected with a toothed segment 17. A spring 7' located between the top wall of the casing 1' and a flange 6' on the rod 5" tends to move the rod 5' upwards and subjects the parts of the conductor 2' to a straining action, thus keeping the parts of the conductor 2′ substantially in the position shown in Fig. 1. The said segment 17 meshes with a toothed wheel 18 connected with the pointer 19 of a measuring apparatus 20, the scale of which is illustrated by a single line. The lead 21 of a source of current is by a flexible conductor 22 connected with the one end of the conductor 2 of the contacting unit. The other end of the said conductor 2 is connected with the contact 11 by a flexible conductor 23, while the contact 10 by a flexible conductor 24 is connected with a lead 25, which extends to the indicator unit and is there connected with the one end of the conductor 2′ by a flexible conductor 26. The other end of the conductor 2′ last mentioned is by a flexible conductor 27 connected to a lead 28 connected with the source of current.

The indicator operates in the following manner. If the steam-pressure increases, the Bourdon-tube 12 moves the contact 11 towards the contact 10 and contact is made. Conductor 2, heated by the electric current, then becomes warmer and consequently all its parts become longer, so that the spring 7 forces the rod 5 upward and the rod 9 moves the contact 10 from the contact 11. The temperature of the conductor 2 immediately drops, so that the conductor 2 moves the contact 10 into contact with the contact 11 at its new position and at a somewhat higher temperature of the conductor 2. The latter then becomes momentarily warmer and longer, which results in the contact 10 being again moved from the contact 11 by the spring 7. This immediately results in a dropping of the temperature of the conductor 2, so that the contact at 10 and 11 is again closed at the new position of the contact 11 and at a still higher temperature of the conductor 2 than before. If the pressure of the steam now ceases to rise, contact 11 stops in a certain position and the closing and interrupting of the current effected by the contact 10 is repeated in a very rapid tempo so that the resistance of contact rises to a certain amount. Although the temperature and length and consequently the resistance of the conductor 2 are changed with the contact resistance and in some degree influence on the intensity of the current passing through the circuit, it is chiefly the contact resistance which influences the intensity of current, so that the moving of the contact 11 towards the right at the increasing of the steam pressure results in a greater intensity of current in the circuit and the moving of the contact towards the left at the decreasing of the steam pressure results in a slighter intensity of current. The changing of the intensity of the current passing through the circuit results in a changing of the temperature and length of the conductor 2′ of the indicator unit. In consequence thereof the deviation of the pointer 19 will be proportional to the increase of the current intensity and thus to the increased pressure of the steam. The indicator operates in a wholly analogous manner as the steam-pressure decreases.

In the same manner variations of temperature may be indicated at a distance for instance by the contact 11 being shifted by the varying pressure of an enclosed air quantity, the temperature and pressure of which varies with the temperature in the chamber, the temperature of which is to be controlled.

For the indicating of the position of a moving body, for instance an elevator cage, the contact 11 may be shifted for instance by a motion transmitting device acted upon by the drum of the elevator. The contact may, for instance, be carried by a screw, which is rotated in stationary screw-threads in the one or the other direction.

By the providing of a pointer 29 on the lever arm 9, said pointer co-operating with a scale, the steam pressure etc. will be indicated directly at the same device, while the indicator unit together with the remote measuring instrument 20 is maintained or omitted.

Instead of the electro-thermic indicating device, any other meter capable of measuring the intensity of a current, for instance, an ampere-meter or volt-meter, may be used, as easily understood by those skilled in the art.

The invention may, evidently be used for many other purposes than those stated above only as examples. The invention may be modified in many respects without exceeding the limits of the same. For instance the construction of the electro-thermic devices may differ from those shown in the drawings.

I claim:

1. In a device for indicating the degree of physical change in a body an electric circuit, a contact device for closing and opening said circuit, a conductor in series with said circuit and adapted to be heated by the electric current, and a member on which a point is changed with regard to its position through the action of the physically changed body on the said member, the said circuit, contact device, conductor and member being so combined that the resistance at the point of contact at the contact device is dependent of the physical change of the body and at the state of equilibrium the conductor assumes a temperature and length corresponding to the said resistance, and a measuring device provided in the circuit and indicating the current intensity then prevailing and substantially dependent of the resistance of the contact and thus indicating the physical change of the body.

2. In a device for indicating the degree of physical change in a body, an electric circuit, a switch comprising a pair of contacts for closing and opening said circuit, means associated with said body for moving one of said contacts with relation to the other when a physical change in said body occurs, a conductor connected to the other of said contacts, said conductor being in series with said circuit and adapted to separate said contacts upon a rise in the temperature of said conductor, the resistance of contact at the said switch being thus dependent of the physical change of the body, and a measuring device provided in the circuit and indicating the current resistance, substantially dependent of the resistance of the contact, and thus indicating the physical change of the body.

3. An indicating system comprising a thermostat element movable commensurably with a change of temperature, an electrical contact movable thereby, a pressure element, an electrical contact movable in accordance with said pressure element and adapted to engage said first contact, electrical heating means for said thermostat element adapted when energized to effect separation of said contacts, a second heating element remotely disposed to the first element, a temperature indicator responsive to heating of said second heating element to indicate the temperature of said second element, a source of electrical current and electrical circuit conductors interconnecting said source said elements and said contacts whereby said contacts control the flow of current from said source through both said elements.

4. In electrically operated apparatus, the combination with a contact point, of a resilient member for urging the contact point in one direction, a second contact point engageable with the first mentioned contact point, a second resilient member for urging the second contact point in the same direction as the first contact point is urged, a wire, means mechanically connecting the wire to said second resilient member whereby the wire controls the movements of said second contact point, means cooperating with said first and second contact points for forming an electrical circuit and subjecting the wire to heat generated by an electrical current, said first and second contact points being adapted to open and close the circuit, and means controlled by the electrical current and movable in response thereto into positions corresponding to the positions assumed by said first contact point.

5. In a device for indicating the change in the pressure in a body at a place remote from said body, an electric circuit and a heater therein, two contacts normally contacting each other, one movable by said body and the other by said heater, an indicator remote from said contacts, and a second heater in said circuit for controlling said indicator.

6. In an indicating system the combination of a contact point, a resilient member for urging the contact point in one direction, a second contact point engageable with the first mentioned contact point, a second resilient member for urging the second contact point in the same direction as the first contact point is urged, a circuit, a heater, means cooperating with said first and second contact points for closing said circuit and operating said heater, and means controlled by the electric current and movable in response thereto into positions corresponding to the positions assumed by said first-mentioned contact point.

7. In an electrical remote control system, electrical current source means, controlling apparatus and controlled apparatus, each of said apparatuses comprising an electrical circuit conductor deformable by the heating effect of current traversing it, electrical flow controlling means associated with the said controlling apparatus conductor controlling a flow of current communicated from said source to said controlling apparatus conductor, said conductor when deformed by the said controlled current therethrough causing said controller to limit the quantitative value of said current flow, and means associated with said controller adapted to increase the current flow communicated to said conductor as aforesaid commensurably with the quantitative value of a physical condition to which said controller is exposed, and means to supply energizing current to said controlled apparatus from said source means commensurable in quantitative value to the current flow through said controlling conductor, and movable means associated with the controlling apparatus movable to any of a plurality of co-relatively progressively advanced operative positions according commensurably to the quantitative value of said energizing current.

8. In an electrical remote control system, a pair of relatively remotely disposed electrically responsive thermostats, current source means supplying current to coincidentally energize said thermostats, electrical current flow controlling means actuatable by one of the thermostats when sufficiently heated to effect a reduction of the current supplied to both thermostats, and biasing means for said controller, affected by the quantitative value of a physical condition to which it is exposed, for predetermining the temperature required to be achieved by said controller actuating thermostat to effect the said reduction of the energizing current flows for both said thermostats, and a movable element actuatable by the other thermostat to cause it to take any of a plurality of progressively advanced positions depending on the temperature achieved by its associated thermostat under the control of said controller, said controlling means comprising a rheostatic controlling element having a controlling element movable to any of a plurality of relatively progressively effective operative positions.

9. An electrical remote control system, in combination with electrical current source means, controlling station apparatus, controlled station apparatus, and electrical circuit conductors interconnecting said source means and said controlling and controlled apparatuses, said controlling apparatus comprising current flow controlling means and said controlling means comprising a rheostatic controlling element having a controlling element movable to any of a plurality of relatively progressively effective operative positions, said flow controlling means being responsive to a physical condition to which it is continuously exposed to effect variations in current flow from the source means to said controlled station apparatus, and also comprising electrical means energizable under the control of said controlling means to substantially equalize and counterbalance the effect of said physical condition upon said flow controlling means, said controlling means exercising the time related commensurable electrical effects upon said electrical means and said controlled apparatus, said controlled apparatus comprising a movable element having a datum position and a plurality of relatively progressively advanced operative positions to any of which it may be moved according to the said electrical effect communicated to the controlled apparatus, said electrical effect being commensurable to the energization of said electrical means required to counterbalance the effect of said condition on said controlling means.

10. An electrical system comprising electrical current source means, relatively remotely disposed controlling and controlled apparatuses, the controlled apparatus comprising electrical energizing means and an element movable from a datum position responsive to the energization thereof to any of a plurality of relatively progressively advanced positions, means to communicate current of varying predetermined time integrated values from said source means to said energizing means under the control of said controlling apparatus, rheostatic means responsive to a physical condition to which the controlling apparatus is exposed tending to continuously effect a flow of current from said source means to said energizing means of predetermined maximum value, and electrical means associated with said controlling rheostatic means and energized from said current source means under the control of said apparatus to approximately balance the operative effect of said condition upon said rheostatic means.

11. In a modulative control for a remote control system, the combination of an electrothermal electro-responsive thermostatic device, a current flow controlling means comprising a pair of relatively movable controlling elements, said device energizable by current flow directed through said controlling means, one of said controlling elements adapted to be moved responsive to the force effects of a physical condition to which it is exposed according to the quantitative value of said force effects, the other element operable by said device movable in such a direction as to cause it to tend to recede from the first element an amount commensurable according to the electro-thermally achieved temperature of said device.

12. In a remote control system, the combination with a source of electrical current, electrical circuit conductors and a relatively remotely disposed electro-responsive device, a current flow controlling means comprising a pair of relatively movable controlling elements, said device energizable by current flow directed through said controlling means, one of said controlling elements adapted to be moved responsive to the force effects of a physical condition to which it is exposed according to the quantitative value of said force effects, the other element operable by said device movable in such a direction as to cause it to tend to recede from the first element an amount commensurable according to the electro-thermally achieved temperature of said device, said electrical circuit conductors communicating current from said source through said controlling means to effect quantitative energization of said device and said electro-responsive means.

13. In a remote control system, the combination with a source of electrical current, electrical circuit conductors and a relatively remotely disposed electro-responsive device, a current flow controlling means comprising a pair of relatively movable controlling elements, said device energizable by current flow directed through said controlling means, one of said controlling elements adapted to be moved responsive to the force effects of a physical condition to which it is exposed according to the quantitative value of said force effects, the other element operable by said device movable in such a direction as to cause it to tend to recede from the first element an amount commensurable according to the electro-thermally achieved temperature of said device, said electrical circuit conductors communicating current from said source through said controlling means to effect quantitative energization of said device and said electro-responsive means, said electro-responsive means comprising an electrically heated thermostat.

14. In an electrical control system, a lever, a pair of electrical contacts, a first one of the contacts being movable responsive to movement of the lever, a thermally responsive element comprising means adapted when heated to a degree commensurable to the amount of movement of the said first contact to effect movement of the other contact in the same direction of movement as effected by the first contact, a controlled element disposed remotely of the thermally responsive element, a source of electrical current, and electrical circuit conductors interconnecting said contacts, said source, and both said elements, said second element adapted to be energized synchronously with the first element, and movable means associated with said second element adapted to be moved responsive to and commensurably to the effective energization thereof.

15. In an electrical system, an electrical switch, movable means for variably moving a first contact of the switch against another contact thereof to close the circuit thereof, a heat operated restoring means for moving said other contact in such a direction as to break engagement with the first contact thereof when exposed to a temperature substantially commensurable to the amount of movement of the first contact, heat operated movable means disposed remotely to said switch, a source of current, electrical circuit conductors interconnecting said switch and said source of current with said elements, said restoring means energized by current through said contacts when closed, said restoring means adapted for cooling responsive to broken engagement between said contacts, whereby said switch under the joint control of said pressure means and said restoring means, is operated periodically to periodically electrically energize said indicator and restoring means.

Signed at Saffle, Sweden, this 23rd day of June, 1925.

TORSTEN KÄLLE.